United States Patent
Tamaki

(10) Patent No.: US 12,431,677 B2
(45) Date of Patent: Sep. 30, 2025

(54) CONNECTOR MODULE WITH A CONNECTION MEMBER CONNECTING AN ELECTRICAL RECEPTACLE ON A SUBSTRATE TO A COMMUNICATION CABLE

(71) Applicant: HOSIDEN CORPORATION, Osaka (JP)

(72) Inventor: Fumitake Tamaki, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 372 days.

(21) Appl. No.: 18/115,826

(22) Filed: Mar. 1, 2023

(65) Prior Publication Data

US 2023/0291157 A1    Sep. 14, 2023

(30) Foreign Application Priority Data

Mar. 14, 2022    (JP) .................................. 2022-039444

(51) Int. Cl.
*H01R 24/50* (2011.01)
*H01R 13/11* (2006.01)
(Continued)

(52) U.S. Cl.
CPC ............. *H01R 24/50* (2013.01); *H01R 13/11* (2013.01); *H01R 13/502* (2013.01); *H01R 13/652* (2013.01); *H01R 2103/00* (2013.01)

(58) Field of Classification Search
CPC ...... H01R 24/50; H01R 13/11; H01R 13/502; H01R 13/652; H01R 13/6594;
(Continued)

(56) References Cited

U.S. PATENT DOCUMENTS

| 11,088,489 B2 * | 8/2021 | Takagi | H02G 15/04 |
| 2018/0226736 A1 * | 8/2018 | Hirakawa | H01R 13/641 |
| 2021/0313746 A1 * | 10/2021 | Kato | H01R 13/6215 |

FOREIGN PATENT DOCUMENTS

| DE | 102020204139 A1 * | 10/2020 | ........... H01R 13/502 |
| DE | 102020209209 A1 * | 1/2021 | ........... H01R 13/631 |

(Continued)

OTHER PUBLICATIONS

Search Report issued Jul. 12, 2023 in EP Appln. No. 23156429.5.

*Primary Examiner* — Peter G Leigh
(74) *Attorney, Agent, or Firm* — Dilworth & Barrese, LLP.; Michael J. Musella, Esq.

(57) ABSTRACT

To provide a connector module with stable EMC, a connector module includes: a receptacle on a substrate; and a plug electrically connected to the receptacle and electrically connectable to a communication cable, the plug including: a connector including an outer conductor electrically connectable to the communication cable; and a connection member connecting the connector to the receptacle and electrically connected to a ground line on the substrate, the outer conductor including: a cylindrical conductor body; and an annular flange extending from the conductor body to a radially outward side, the flange including a step on a facing side facing the connection member, the connection member being in contact with an upper level portion or a lower level portion.

16 Claims, 10 Drawing Sheets

(51) Int. Cl.
  *H01R 13/502* (2006.01)
  *H01R 13/652* (2006.01)
  *H01R 103/00* (2006.01)

(58) Field of Classification Search
  CPC .............. H01R 13/658; H01R 13/6582; H01R 13/6598; H01R 2103/00; H01R 12/91
  USPC ........................................................ 439/578
  See application file for complete search history.

(56) References Cited

FOREIGN PATENT DOCUMENTS

| | | | | |
|---|---|---|---|---|
| EP | 3264537 | A1 * | 1/2018 | ............... B60R 1/00 |
| JP | 3225606 | | 3/2020 | |
| JP | 6712376 | B1 * | 6/2020 | ........... H01R 13/631 |

* cited by examiner

CONNECTOR MODULE WITH A CONNECTION MEMBER CONNECTING AN ELECTRICAL RECEPTACLE ON A SUBSTRATE TO A COMMUNICATION CABLE

CROSS REFERENCE TO RELATED APPLICATION

This application is based on and claims priority under 35 U.S.C. Section 119 to Japanese Patent Applications No. 2022-039444 filed on Mar. 14, 2022 the entire content of which are incorporated herein by reference.

TECHNICAL FIELD

This disclosure relates to a connector module.

BACKGROUND ART

There has been known a connector for connection to a connection target instrument such as a camera (see, for example, Japanese Registered Utility Model Publication No. 3225606).

Japanese Registered Utility Model Publication No. 3225606 discloses a camera assembly including a camera, a circuit board, a combination connector, and a connector.

The camera assembly further includes a base and an upper cover covering the base. The base supports the combination connector and the connector. The connector includes a housing, a connecting terminal in the housing, and an outside conductor sleeved to the outer surface of the housing. The connecting terminal includes a plug-in section that has a plug-in hole configured to receive a combination terminal of the configuration connector, that includes springy strips around the plug-in hole, and that is configured to clamp the combination terminal for electric connection thereto. The outside conductor of the connector includes a plurality of weld legs connected to the circuit board and a plurality of elastic engagement strips. Sleeving the housing of the combination terminal (combination housing) to the outer surface of the housing of the connector presses the elastic engagement strips against the combination housing and inserts the combination terminal into the plug-in hole in the connecting terminal.

SUMMARY

The above camera assembly involves the following issue: Misalignment between the combination connector and the connector causes the combination housing and the elastic engagement strips to be in no contact with each other or in contact with each other with an insufficient contact point pressure, thereby leading to unstable electric connection. This may in turn cause the camera assembly to be grounded weakly, with the result of poor electro-magnetic compatibility (EMC).

The above circumstances have led to a demand for a connector module with stable EMC.

Solution to Problem

In view of the above circumstances, a connector module according to an aspect includes: a receptacle on a substrate; and a plug electrically connected to the receptacle and electrically connectable to a communication cable, the plug including: a connector including an outer conductor electrically connectable to the communication cable; and a connection member connecting the connector to the receptacle and electrically connected to a ground line on the substrate, the outer conductor including: a cylindrical conductor body; and an annular flange extending from the conductor body to a radially outward side, the flange including a step on a facing side facing the connection member, the connection member being in contact with an upper level portion of the flange relative to the step or a lower level portion of the flange relative to the step.

The ground line on a substrate typically allows noise to escape from a signal line or power supply line on the substrate. The connection member configured as above is electrically connected to the ground line on the substrate and to an outer conductor electrically connected to a communication cable. This allows the noise that the ground line has received to escape therefrom through the connection member and the outer conductor to the communication cable and finally to an external ground potential. This in turn allows noise to be removed from the IC on the substrate to prevent a decrease in the electro-magnetic compatibility (EMC).

The above configuration involves a step on a side of the flange of the outer conductor which side faces the connection member. This allows a worker to easily distinguish between the upper level portion and the lower level portion when, for instance, joining the outer conductor to another member. This in turn prevents a jig or the like from coming into contact with a surface with which the connection member is in contact (namely, the upper level portion or the lower level portion). The above configuration thereby ensures contact between the outer conductor and the connection member to prevent a decrease in the EMC.

The connector module may preferably be configured such that the receptacle includes at least one ground member electrically connected to the ground line, and the connection member is electrically connected to the ground line through the at least one ground member.

With the above configuration, the receptacle includes at least one ground member electrically connected to the ground line, and the connection member is electrically connected to the ground line through the at least one ground member. The ground member may have any shape. Simply stabilizing the contact between the connection member and the ground member prevents a decrease in the EMC.

The connector module may preferably be configured such that the connection member is in contact with the upper level portion.

The above configuration allows the connection member to be in contact with the upper level portion and not the lower level portion, with which a jig or the like typically comes into contact. This prevents a decrease in the EMC.

The worker is also able to bring a jig or the like into contact with the lower level portion to fix the jig. This allows not only the jig but also the connection member and the outer conductor to be small, and in turn allows production of a small connector module.

The connector module may preferably be configured such that the connection member includes: a ring fitted around the outer conductor; and a first coupler extending from the ring on a side of the flange and including a plurality of elastic first coupler portions.

With the above configuration, the first coupler includes a plurality of elastic first coupler portions. This allows the connection member to be in contact with the outer conductor at a plurality of contact points for improved contact stability.

Further, the connection member serves as an antenna for conducting electromagnetic waves to prevent emission thereof for better EMC.

The connector module may preferably be configured such that the connection member further includes: a second coupler opposite to the first coupler across the ring and including a plurality of elastic second coupler portions in contact with the receptacle in such a manner as to be displaceable, and the first coupler portions are in contact with the upper level portion in such a manner as to be displaceable toward or away from the flange.

With the above configuration, the connection member includes a plurality of second coupler portions in contact with the receptacle in such a manner that the second coupler portions are displaceable. The connector may thus be misaligned in the radial direction relative to the receptacle. However, the first coupler portions are capable of accommodating displacement of the connection member as they are in contact with the upper level portion in such a manner as to be displaceable in the axial direction (that is, toward or away from the flange). The first coupler portions are, in other words, in contact with the upper level portion with a pressure unaffected by displacement of the connection member in the radial direction. This ensures contact between the outer conductor and the connection member.

The connector module may preferably be configured such that the ring includes an elastic protrusion, the outer conductor further includes a cylindrical conductor extension having a base end at the flange, extending toward the connection member, and including: a cylindrical portion extending from the base end; and a leading end portion disposed on a side of a leading end of the cylindrical conductor extension and having a diameter larger than a diameter of the cylindrical portion, and the protrusion is locked by a step between the cylindrical portion and the leading end portion.

With the above configuration, locking the elastic protrusion with a step between the cylindrical portion and leading end portion of the outer conductor reduces tolerances of contact point misalignment between the outer conductor and the connection member in the axial direction. This allows the receptacle to be small in the axial direction, and thereby allows production of a small connector module.

The connector module may preferably be configured such that the upper level portion is on the radially outward side of the lower level portion.

With the above configuration, the upper level portion of the outer conductor is on the radially outward side of the lower level portion. This allows the connection member to, when in contact with the upper level portion, include first coupler portions each long from its fixed end (that is, the ring) to its point of contact with the outer conductor. This in turn allows the first coupler portions to be elastically deformed by a large amount and to thereby be in contact with the outer conductor with a large pressure. The above configuration thereby allows for high contact reliability to prevent a decrease in the EMC.

The connector module may preferably be configured such that the outer conductor is made of a base material containing a main component identical in ionization tendency to a main component of a base material of the connection member.

With the above configuration, that the outer conductor is made of a base material containing a main component substantially identical in ionization tendency to the main component of the base material of the connection member. This reduces the risk of a contact failure by electrolytic corrosion to prevent a decrease in the EMC.

The connector module may preferably be configured such that the plug further includes a shield housing covering at least a portion of the substrate and made of a base material containing a main component stronger in ionization tendency than the main component of the connection member.

With the above configuration, the plug further includes a shield housing covering at least a portion of the substrate and made of a base material containing a main component stronger in ionization tendency than the main component of the connection member. The shield housing effectively shields the substrate from external electromagnetic waves and also blocks noise emitted from the substrate.

The connector module may preferably be configured such that the outer conductor and the connection member are each made of copper or a copper alloy.

With the above configuration, the outer conductor and the connection member are each made of copper or a copper alloy, each of which is highly elastic. This allows for stress relaxation and prevents the contact reliability from being decreased by repeated insertion and removal.

The connector module may preferably be configured such that the flange has a joint surface opposite to the facing side and joined to the shield housing, and the shield housing is electrically connected to the flange via the joint surface.

With the above configuration, the outer conductor has a joint surface joined to the shield housing, and the shield housing is electrically connected to the flange via the joint surface. This allows noise to escape from the IC on the substrate through the shield housing and the outer conductor to an external ground potential for better EMC.

Further, the outer conductor and the shield housing are joined to each other for electric connection with an alloy layer therebetween. This ensures contact between the outer conductor and the shield housing to prevent a decrease in the EMC even if, for instance, the outer conductor and the shield housing are electrolytically corroded due to a difference in ionization tendency between their respective materials.

DESCRIPTION OF EMBODIMENTS

The description below deals with a connector module as an embodiment of this disclosure with reference to drawings. This disclosure is, however, not limited to the embodiment below, and may be altered variously without departing from its scope. The present embodiment is a connector module 100 included in a camera unit U mounted in a vehicle (in other words, a vehicle-mounted camera). The camera unit U may alternatively be mounted in, for example, a bicycle or a drone other than a vehicle.

Camera Unit

Figure 1:
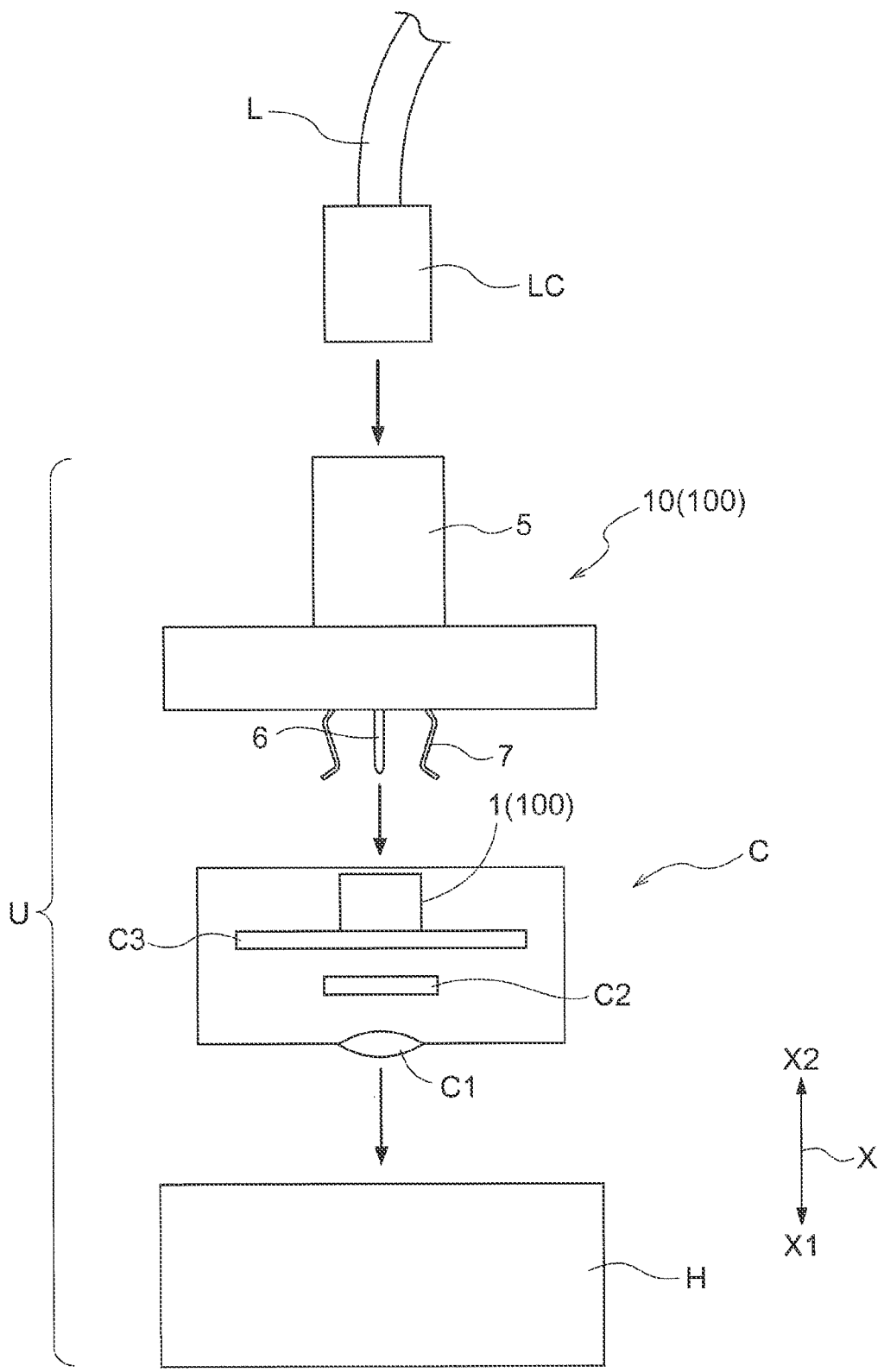
FIG. 1 is a diagram schematically illustrating the configuration of a camera unit for an embodiment.

As illustrated in FIG. 1, the camera unit U is electrically connected to a monitor (not shown) with use of a coaxial cable L.

The coaxial cable L is a communication cable for carrying electric signals. The coaxial cable L includes an inner conductor, an outer conductor coaxial with the inner conductor, and a dielectric (insulator) therebetween. The inner conductor is in the form of a bundle of copper wires. The outer conductor is in the form of a mesh of copper wires around the inner conductor, and functions as a shield for preventing exit of signals and entry of electric waves. The coaxial cable L transmits signals from the camera unit U to the monitor, and electric power from the monitor to the camera unit U.

The camera unit U includes a camera housing H, a camera module C in the camera housing H, and a plug 10 connected to the camera module C. The camera housing H is made of an electrically conductive metal. The camera unit U is usable in any orientation. The description below uses the expression "axial direction X" to refer to the direction connecting the plug 10 with the camera module C, "X1 side" to refer to that side in the axial direction X on which the camera module C is present, and "X2 side" to refer to that side in the axial direction X on which the plug 10 is present.

The camera module C includes an optical system C1, an image capture element C2, and a substrate C3. The optical system C1 includes at least one lens configured to receive light from an object. The image capture element C2 is, for example, a charge coupled device (CCD) or a complementary metal oxide semiconductor (CMOS) device configured to output an electric signal based on light collected by the optical system C1. The substrate C3 supports thereon an electronic circuit configured to drive the image capture element C2 and process the electric signal from the image capture element C2. The substrate C3 also supports a receptacle 1, which combines with the plug 10 to constitute the connector module 100.

Receptacle

Figure 2:
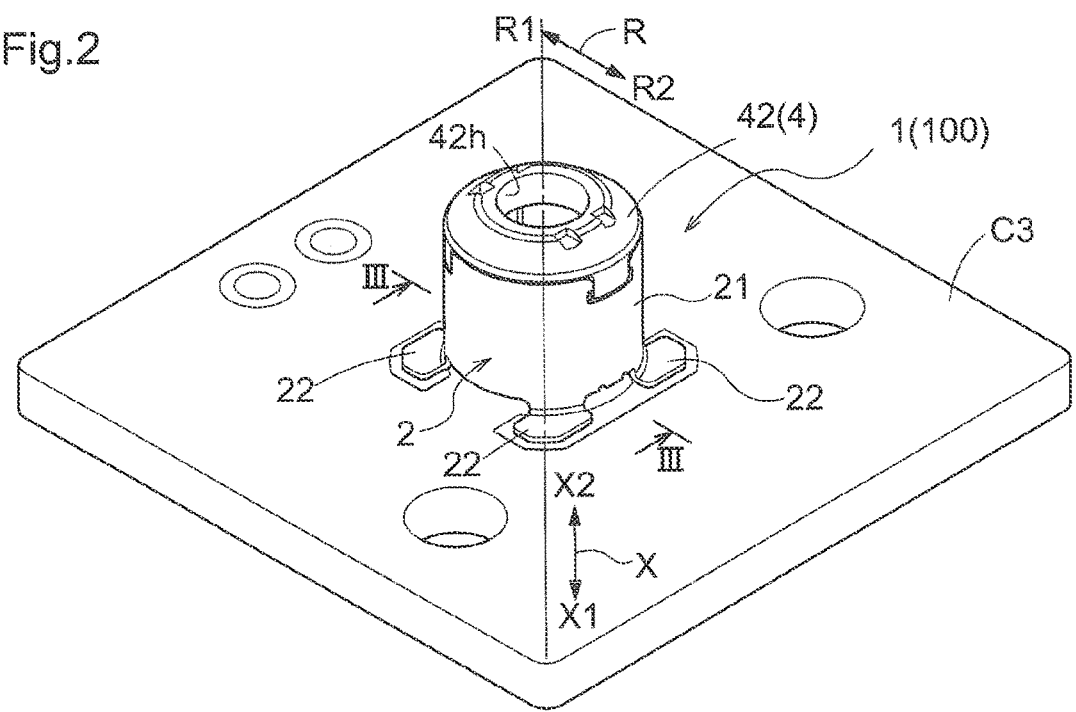
FIG. 2 is a perspective view of a receptacle on a substrate for an embodiment.
Figure 3:
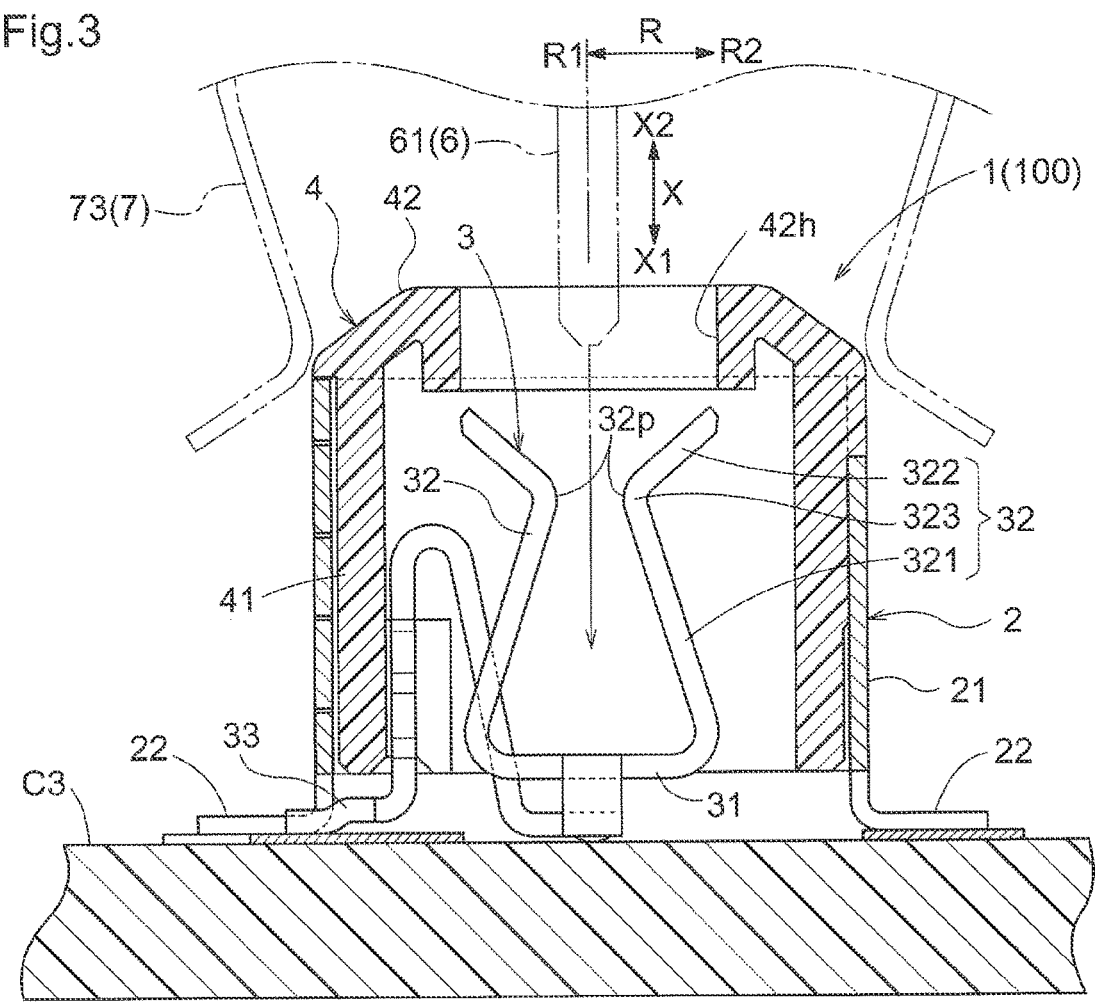
FIG. 3 is a cross-sectional view of the receptacle in FIG. 2 taken along line III-III in FIG. 2.
Figure 4:
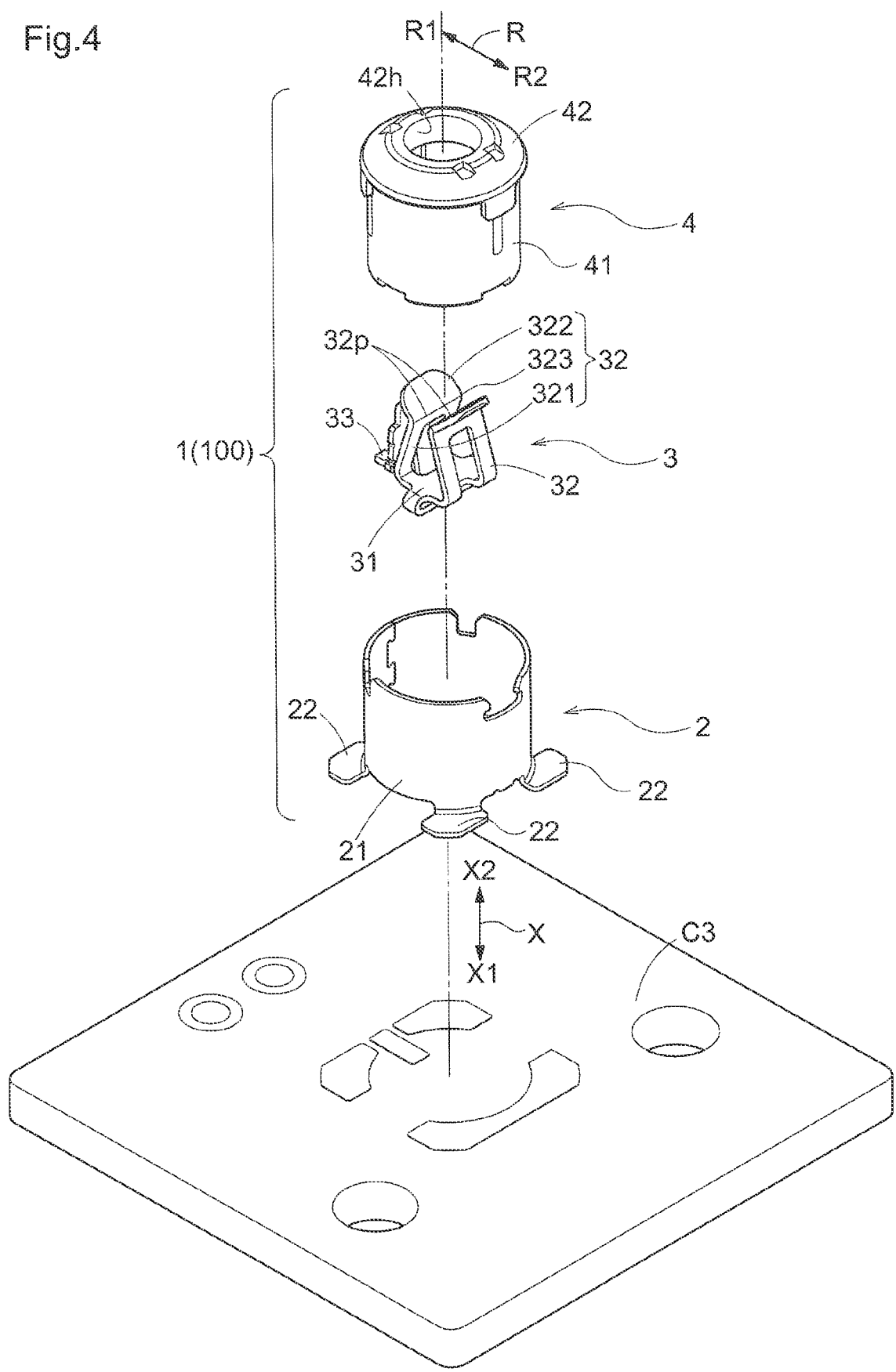
FIG. 4 is an exploded perspective view of a receptacle for an embodiment.
Figure 5:
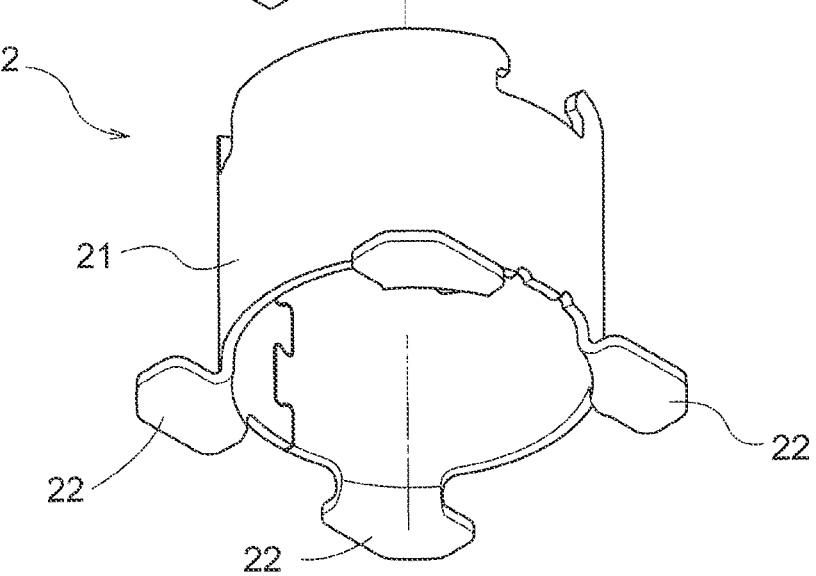
FIG. 5 is an exploded perspective view of a receptacle for an embodiment.

The description below deals with the receptacle 1 with reference to FIGS. 2 to 5. FIG. 2 is a perspective view of the receptacle 1 on the substrate C3. FIG. 3 is a cross-sectional view of the receptacle 1 taken along line III-III in FIG. 2. FIGS. 4 and 5 are each an exploded perspective view of the receptacle 1. The description below uses the expression "radial direction R" to refer to any direction orthogonal to the axial direction X, "radially inward side R1" to refer to the side inward in the radial direction R, and "radially outward side R2" to refer to the side outward in the radial direction R.

As illustrated in FIGS. 2 to 4, the receptacle 1 includes a shell 2, a first contact 3, and a contact housing 4. The shell 2 (which is an example of the "ground member") and the first contact 3 are each electrically conductive, and are connected to the substrate C3. The first contact 3 is contained in the contact housing 4, which is in turn covered by the shell 2, so that they are arranged in that order from inward in the radial direction R to outward in the radial direction R.

Shell

As illustrated in FIGS. 4 and 5, the shell 2 includes a cylindrical shell body 21 and a plurality of legs 22 each having a base end at that end of the shell body 21 which is on the X1 side and extending from the shell body 21 to the radially outward side R2. As illustrated in FIG. 5, the shell 2 for the present embodiment includes four legs 22. The shell 2 may, however, include any number of legs 22.

The legs 22 are soldered or otherwise fixed to a ground line on the substrate C3, so that the shell 2 is electrically connected the ground line.

First Contact

As illustrated in FIGS. 3 to 5, the first contact 3 includes a bottom 31, two standing portions 32, and an extension 33. The bottom 31 is substantially rectangular in a plan view. The standing portions 32 extend upward from respective ends of the bottom 31 to the X2 side. The extension 33 extends from the bottom 31 in a direction parallel to the principal plane of the bottom 31. The description below uses the expression "in a plan view" to mean that something is viewed in the axial direction X.

The standing portions 32 are each in the form of a plate, and are symmetric with respect to an axis in the axial direction X. The standing portions 32 are so elastic as to be deformable in the radial direction R, and are so shaped as to sandwich a second contact 61 (described later).

The standing portions 32 are each in the form of a wide plate. The standing portions 32 are larger in the radial direction R than the second contact 61, and each have a width that ensures electric connection with the second contact 61 within the tolerances in misalignment between the receptacle 1 and the plug 10. The standing portions 32 include respective approaching sections 321, respective separating sections 322, and respective bends 323. The approaching sections 321 become closer to each other as farther away from the bottom 31. The separating sections 322 become farther away from each other as farther away from the approaching sections 321. The bends 323 are between the approaching sections 321 and the separating sections 322, and connect the approaching sections 321 with the separating sections 322. The bends 323 function as a first contact point 32p for contact with the second contact 61.

The extension 33 has a base end at the bottom 31 and extends to the radially outward side R2. The extension 33 has a leading end soldered or otherwise fixed to the substrate C3 (see FIG. 3) so that the first contact 3 is electrically connected to the substrate C3.

Contact Housing

The contact housing 4 is electrically insulative, and is made of resin, for example. As illustrated in FIGS. 4 and 5, the contact housing 4 is in the form of a lidded cylinder including a cylindrical body 41 and a lid 42 disposed at an opening of the body 41 and having a through hole 42h extending in the axial direction X (see FIG. 3 as well). As illustrated in FIG. 3, the contact housing 4, which contains the first contact 3 in the body 41, is contained in and covered by the shell body 21 of the shell 2. In other words, the contact housing 4 is covered by the shell body 21.

The receptacle 1 receives the plug 10, which is connected to the coaxial cable L described above with reference to FIG. 1. Coupling the plug 10 to the receptacle 1 electrically connects the plug 10 to the receptacle 1, so that the camera unit U is electrically connected to the monitor through the receptacle 1, the plug 10, and the coaxial cable L.

Plug

Figure 6:
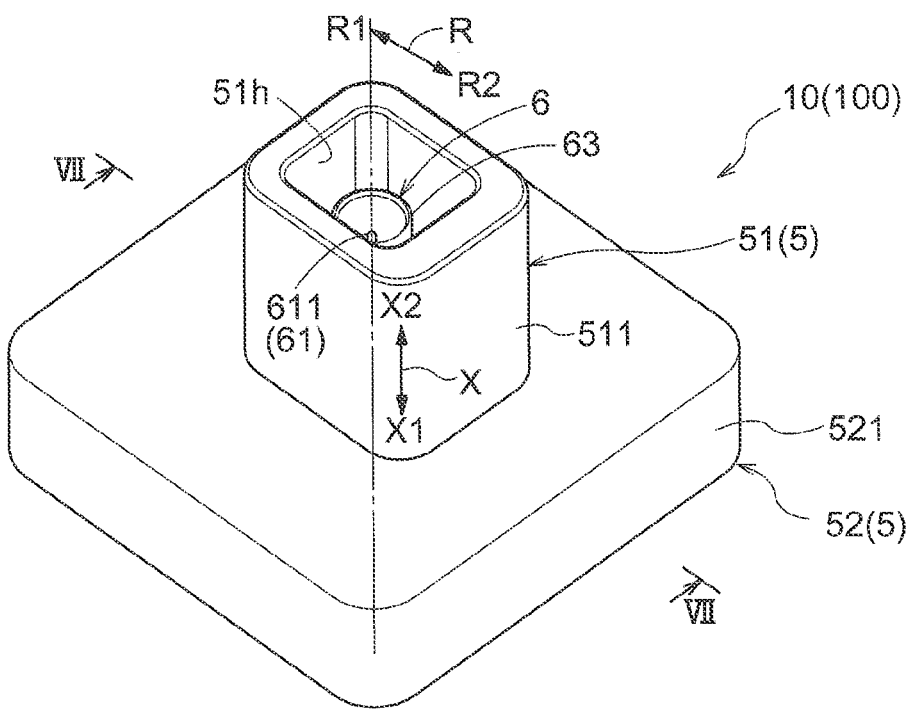
FIG. 6 is a perspective view of a plug for an embodiment.
Figure 7:
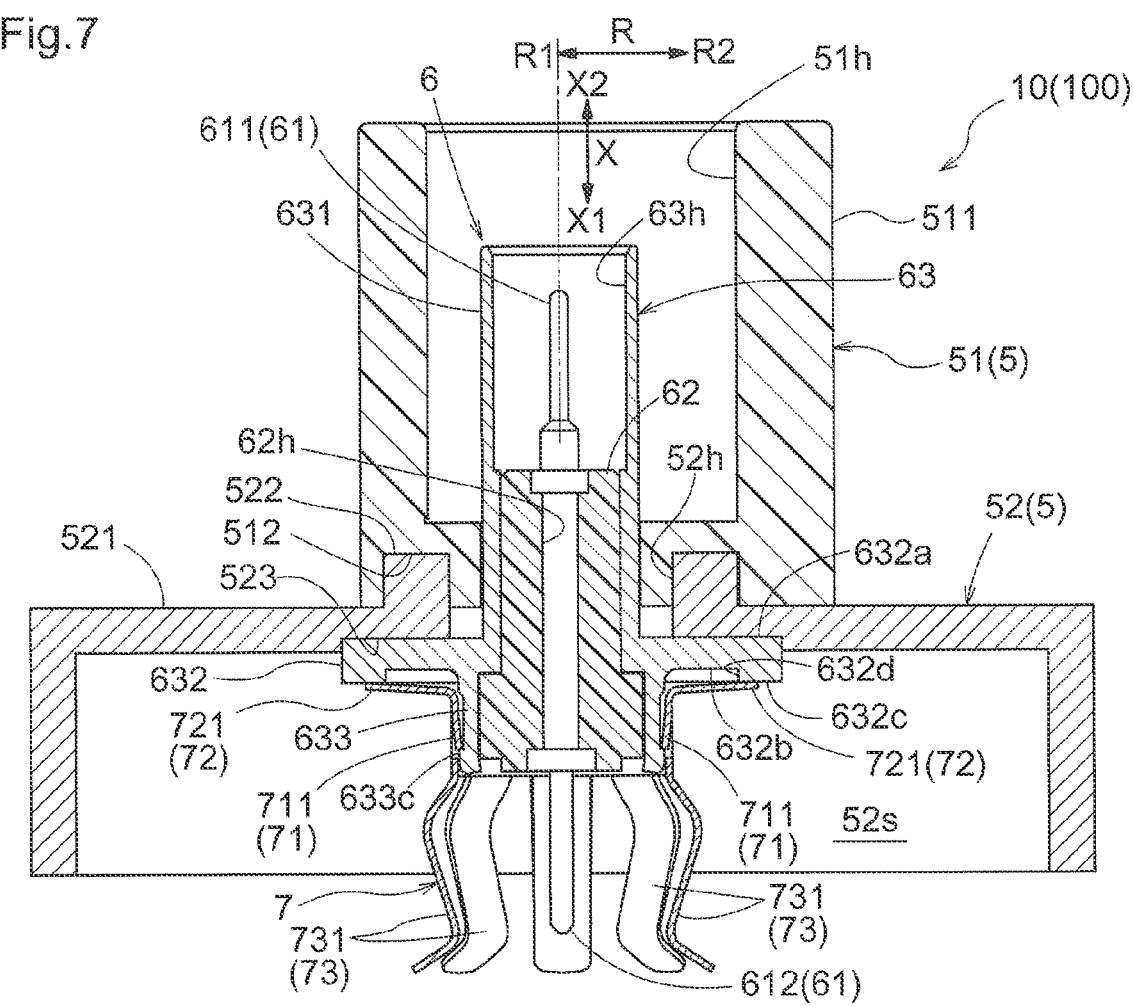
FIG. 7 is a cross-sectional view of the plug in FIG. 6 taken along line VII-VII in FIG. 6.
Figure 8:
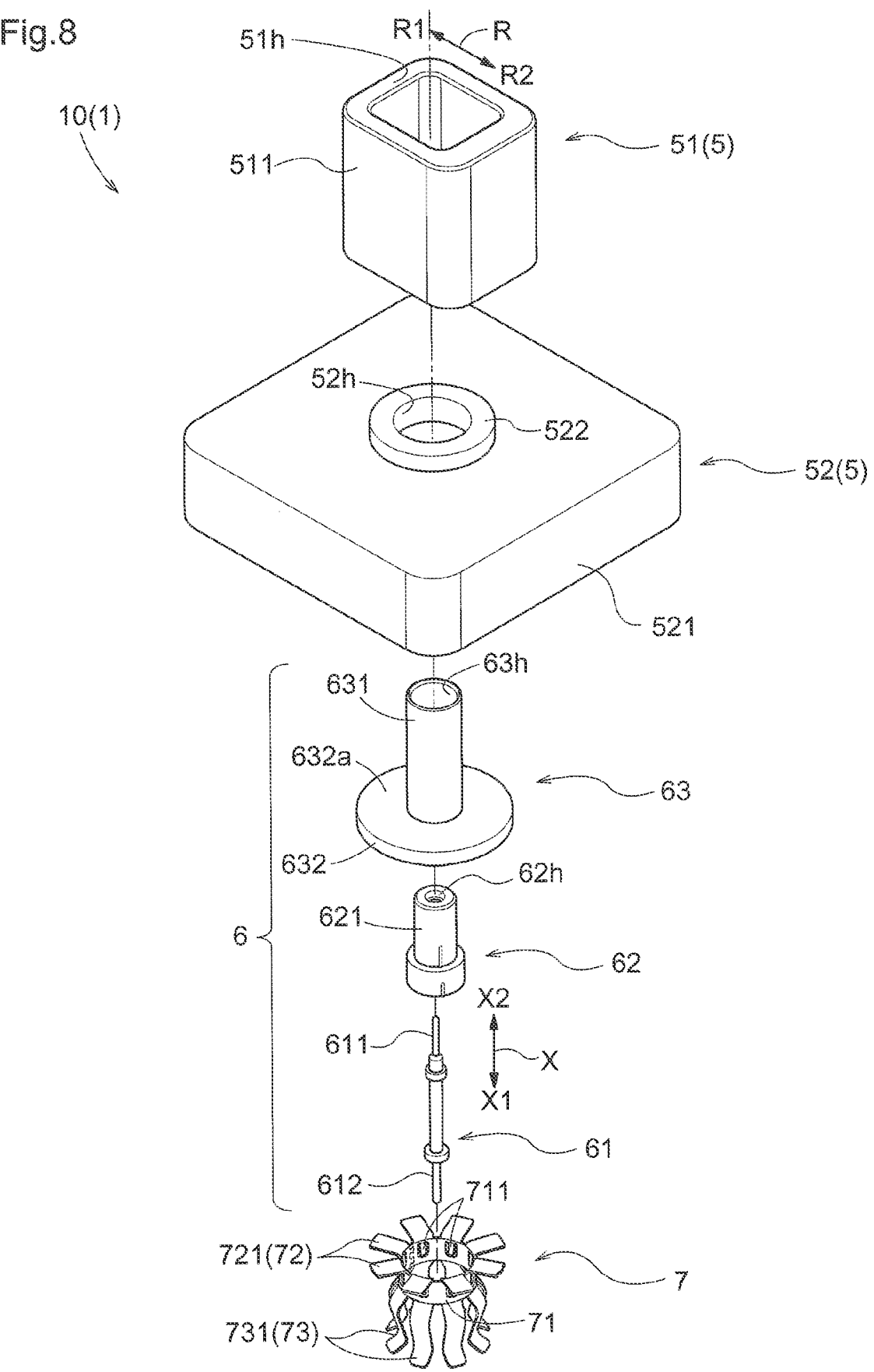
FIG. 8 is an exploded perspective view of a plug for an embodiment.
Figure 9:
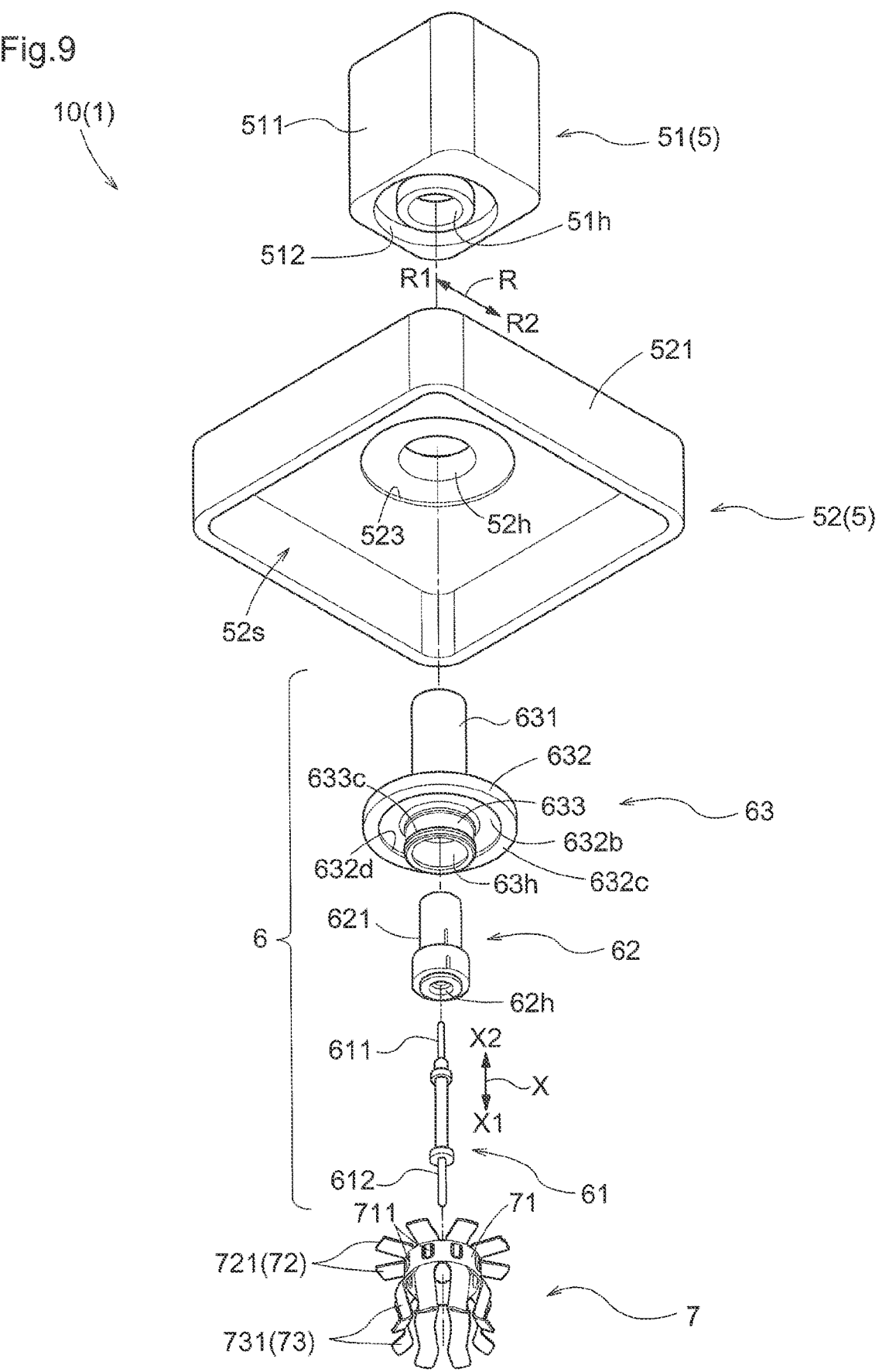
FIG. 9 is an exploded perspective view of a plug for an embodiment.

FIG. 6 is a perspective view of the plug 10. FIG. 7 is a cross-sectional view of the plug 10 taken along line VII-VII in FIG. 6. FIGS. 8 and 9 are each an exploded perspective view of the plug 10.

As illustrated in FIGS. 6 to 9, the plug 10 includes a plug housing 5 and a connector 6 in the plug housing 5. As illustrated in FIGS. 7 to 9, the plug 10 further includes a connection member 7 for electrically connecting the connector 6 to the receptacle 1 (see FIG. 2). Connecting the connector 6 to the receptacle 1 through the connection member 7 electrically connects the plug 10 to the receptacle 1.

Plug Housing

The plug housing 5 includes a first housing section 51 and a second housing section 52 (which is an example of the "shield housing"). The first housing section 51 may be electrically insulative or conductive, whereas the second housing section 52 is made of an electrically conductive metal.

As illustrated in FIGS. 6, 8, and 9, the first and second housing sections 51 and 52 each have a substantially rectangular shape as viewed in the axial direction X.

The first housing section 51 is in the form of a prism, and has an outer shape with a dimension smaller than that of the second housing section 52. The first housing section 51 includes a first housing body 511 having a substantially rectangular shape in a plan view and also having a first housing hole 51$h$ extending through the first housing body 511 in the axial direction X from that end of the first housing body 511 which is on the X2 side. The first housing hole 51$h$ has (i) an angular portion down to a position close to that end of the first housing body 511 which is on the X1 side and (ii) a circular portion continuously under the angular portion and smaller than the angular portion.

As illustrated in FIG. 9, the first housing section 51 has a first housing recess 512 around the circular portion of the first housing hole 51$h$ on the radially outward side R2.

As illustrated in FIG. 8, the second housing section 52 includes a second housing body 521 having a substantially rectangular shape in a plan view and a housing protrusion 522 protruding from the second housing body 521 to the X2 side. The second housing body 521 has a second housing hole 52$h$ extending therethrough in the axial direction X. The housing protrusion 522 is so disposed around the second housing hole 52$h$ as to fit into the first housing recess 512 of the first housing section 51 described above with reference to FIG. 9. This allows the first housing section 51 and the second housing section 52 to be coupled to each other as illustrated in FIG. 7.

As illustrated in FIG. 9, the second housing section 52 includes, on a surface opposite to the surface on which the housing protrusion 522 is disposed, a second housing recess 523 around the second housing hole 52$h$ and a container space 52$s$ containing the connector 6.

Figure 12:
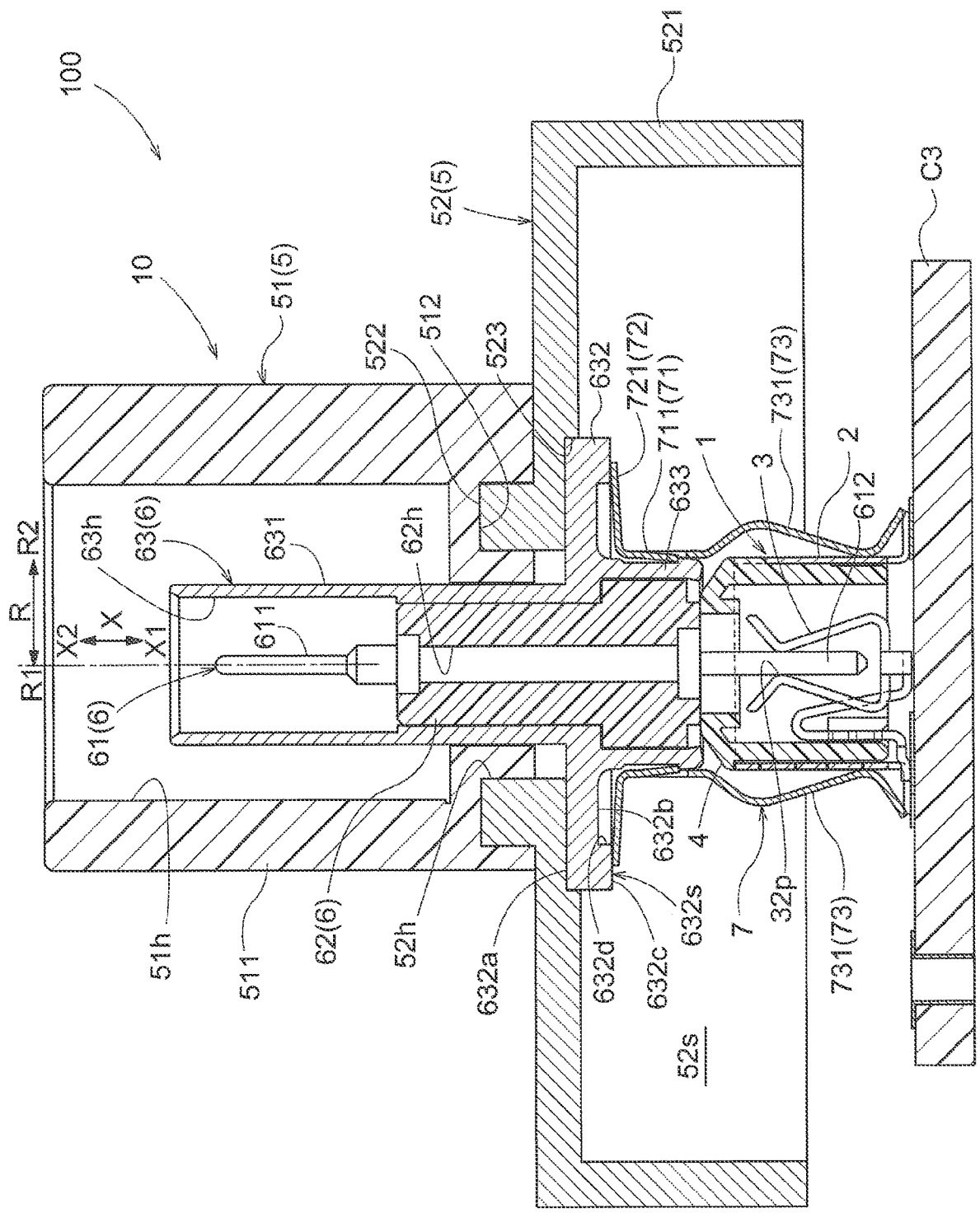
FIG. 12 is a cross-sectional view of a receptacle and plug for an embodiment.

The present embodiment is configured as illustrated in FIG. 12 such that with the plug 10 connected to the receptacle 1, the second housing section 52 faces and covers an entire surface of the substrate C3 in the camera housing H. The second housing section 52 is electrically conductive, and functions as a shield for the substrate C3.

The second housing section 52 is made of an electrically conductive material and produced by sheet metal working, casting, machining, or the like. The second housing section 52 may alternatively include an electrically insulative resin member surface-treated by plating, painting, vapor deposition, or the like with a metal. The second housing section 52 for the present embodiment is made of a base material containing aluminum, which has a good heat dissipation property, as a main component. This prevents components such as the integrated circuit (IC) on the substrate C3 from being heated up excessively and malfunctioning in consequence.

The second housing section 52 is laser-welded or otherwise joined to the camera housing H described above with reference to FIG. 1. The camera housing H for the present embodiment is made of the same material as that of the second housing section 52, that is, a base material containing aluminum as a main component. The second housing section 52 for the present embodiment covers an entire surface of the substrate C3 together with the camera housing H, and functions as a shield for the substrate C3.

Connector

As illustrated in FIGS. 8 and 9, the connector 6 includes a second contact 61 (which is an example of the "contact") connected to the receptacle 1, a holder 62 holding the second contact 61, and an outer conductor 63 covering the holder 62 from the radially outward side R2. As illustrated in FIGS. 7 and 12, the second contact 61, the holder 62, and the outer conductor 63 are arranged in this order from inward in the radial direction R to outside in the radial direction R.

Second Contact

The second contact 61 is electrically conductive, and electrically connects the receptacle 1 to the coaxial cable L described above with reference to FIG. 1. The second contact 61 is produced by sheet metal working, casting, machining, 3D-printing, or the like.

As illustrated in FIGS. 7 and 9, the second contact 61 is in the form of a bar including a first contact point section 611 for connection to the inner conductor of the coaxial cable L and a second contact point section 612 for connection to the first contact point 32$p$ of the first contact 3 of the receptacle 1 (see FIG. 12). Connecting the first contact point section 611 to the inner conductor of the coaxial cable L and the second contact point section 612 to the first contact point 32$p$ electrically connects the receptacle 1 to the coaxial cable L.

As illustrated in FIG. 7, the second contact 61 is inserted through the first housing hole 51$h$. The first housing hole 51$h$ also receives a connector of the coaxial cable L (hereinafter referred to as "external connector LC"), so that the second contact 61 is electrically connected to the external connector LC inside the first housing hole 51$h$. The external connector LC includes a connection section (that is, an outer portion of a molded portion). Fitting the connection section into the first housing hole 51$h$ ensures electric connection between the second contact 61 and the external connector LC inside the first housing hole 51$h$.

Holder

As illustrated in FIGS. 7 to 9, the holder 62 is in the form of a cylinder having a portion with a diameter larger than that of the remaining portion. The holder 62 is electrically insulative, and is made of resin, for example.

As illustrated in FIGS. 8 and 9, the holder 62 includes a cylindrical holder body 621 having a portion with a larger diameter and also having a holder through hole 62$h$ extending through the holder body 621 in the axial direction X.

As illustrated in FIG. 7, the holder through hole 62$h$ is so shaped as to correspond to the outer shape of the second contact 61, and receives the second contact 61 therein. The second contact 61 is, for example, press-fitted or insertmolded in the holder 62, and is held by the holder 62. With the second contact 61 held by the holder 62, the first and second contact point sections 611 and 612 protrude from the holder 62.

The holder 62 holding the second contact 61 therein is in the outer conductor 63.

Outer Conductor

As illustrated in FIGS. 7 to 9, the outer conductor 63 includes a conductor body 631 substantially in the form of a cylinder and a flange 632 in the form of an annular ring extending from the conductor body 631 to the radially outward side R2.

Figure 10:
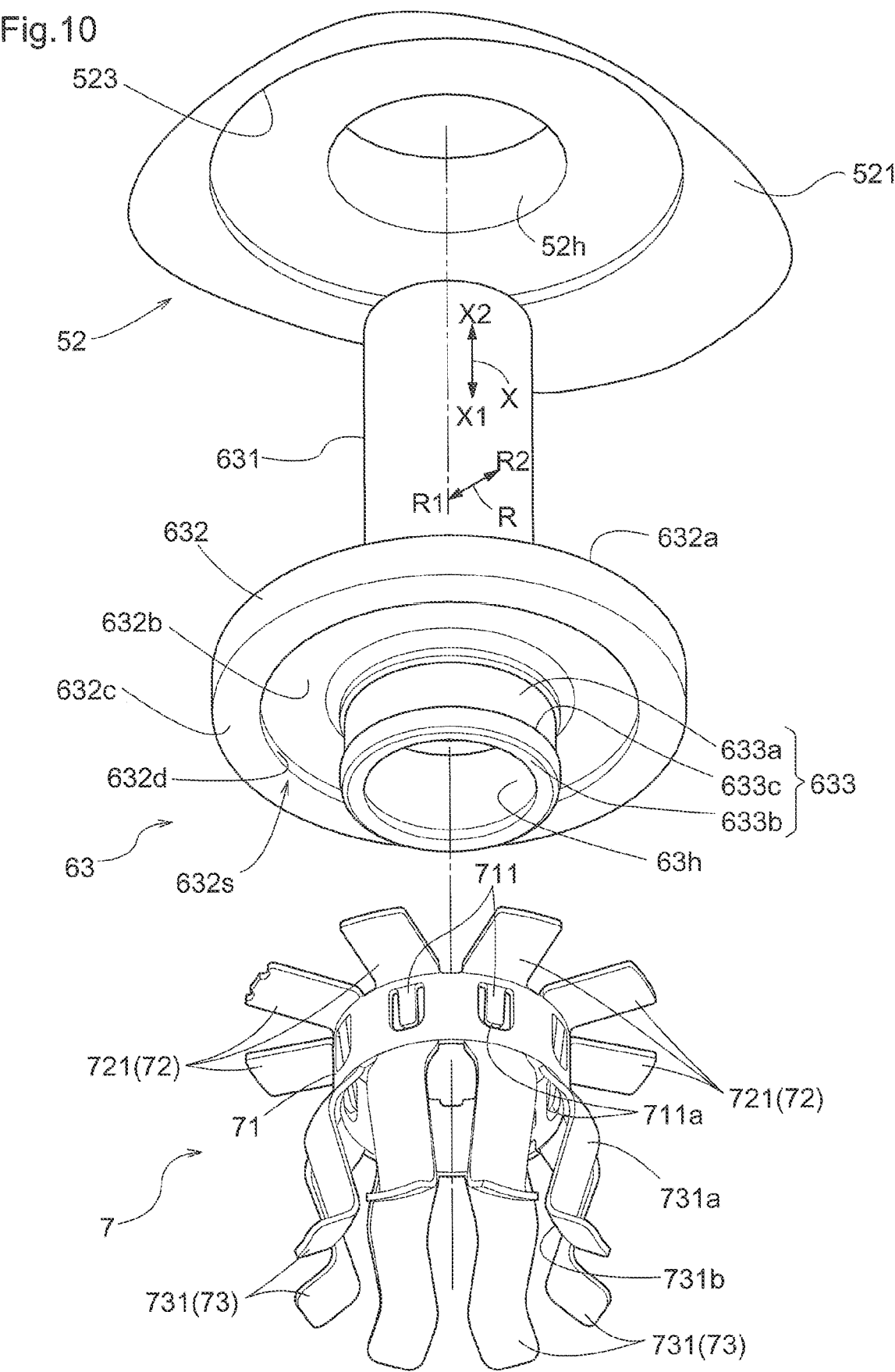
FIG. 10 is a perspective view of an outer conductor and connection member for an embodiment.
Figure 11:
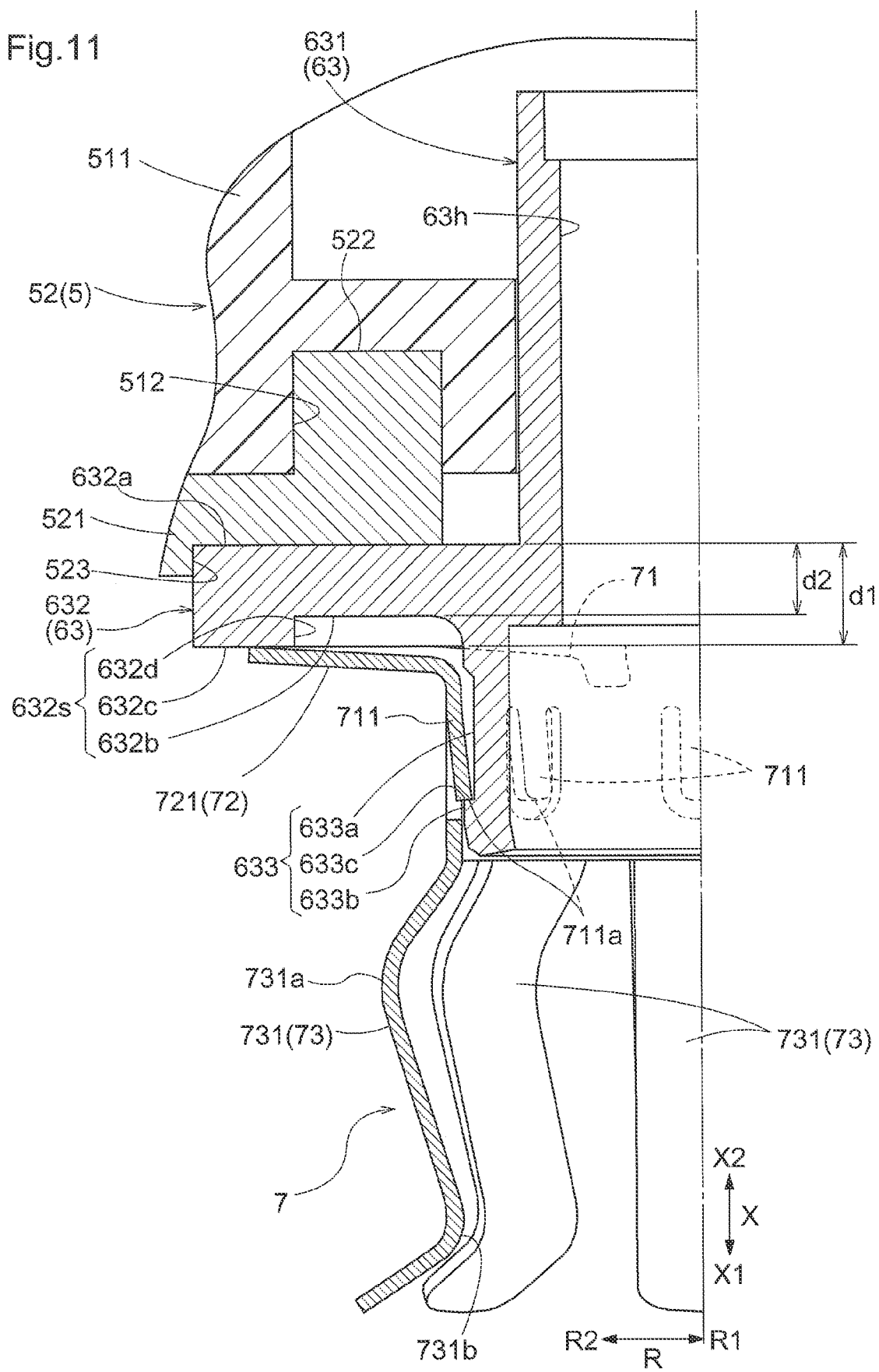
FIG. 11 is an enlarged view of a portion of the outer conductor in FIG. 10 and its surroundings.

As illustrated in FIGS. 9 to 11, the outer conductor 63 further includes a conductor extension 633 substantially in the form of a cylinder having a base end at the flange 632 and extending in the axial direction X toward the connection member 7 (that is, to the X1 side). The outer conductor 63 has a conductor through hole 63$h$ extending through the conductor body 631, the flange 632, and the conductor extension 633 in the axial direction X. FIG. 10 is a perspective view of the outer conductor 63 and the connection member 7. FIG. 11 is an enlarged view of a portion of the outer conductor 63 in FIG. 10 and its surroundings.

As illustrated in FIG. 7, the conductor through hole 63$h$ contains the holder 62 holding the second contact 61 therein. The holder 62 in the conductor through hole 63$h$ is at least partially in contact with the wall surface that defines the conductor through hole 63$h$.

The outer conductor 63 is electrically conductive, and is electrically connectable to the outer conductor of the coaxial cable L (see FIG. 1). The outer conductor 63 is produced by sheet metal working, casting, machining, 3D-printing, or the like. The outer conductor 63 may alternatively include an electrically insulative resin member surface-treated by plating, painting, vapor deposition, or the like with a metal for electric conductivity. The outer conductor 63 for the present embodiment is made of copper, which is a good electric conductor, or a copper alloy.

As illustrated in FIG. 8, the flange 632 has a joint surface 632$a$ joined to the second housing section 52.

The joint surface 632$a$ is, for example, ultrasonic-welded, resistance-welded, laser-welded, soldered, or mechanically joined to the second housing recess 523 (see FIG. 7), so that the outer conductor 63 is electrically connected to the second housing section 52.

As illustrated in FIGS. 10 and 11, the flange 632 has an annular facing side 632$s$ facing the connection member 7 and opposite to the joint surface 632$a$. The facing side 632$s$ includes a contact surface 632$c$ (which is an example of the "upper level portion") in contact with the connection member 7 and a press surface 632$b$ (which is an example of the "lower level portion") with which a jig or the like comes into contact when the joint surface 632$a$ is joined to the second housing recess 523. The contact surface 632$c$ and the press surface 632$b$ are each around the conductor extension 633. The present embodiment is configured such that the contact surface 632$c$ is on the radially outward side R2 of the press surface 632$b$.

The facing side 632$s$ has a step 632$d$ so that the contact surface 632$c$ and the press surface 632$b$ differ from each other in height (that is, in position in the axial direction X). Specifically, the contact surface 632$c$ is at the upper level relative to the step 632$d$, whereas the press surface 632$b$ is at the lower level relative to the step 632$d$. The contact surface 632$c$ is thus closer to the connection member 7 than the press surface 632$b$ is.

The present embodiment is configured as illustrated in FIG. 11 such that the joint surface 632$a$ is flat and that the contact surface 632$c$ is apart from the joint surface 632$a$ by a distance (first thickness d1) larger than the distance (second thickness d2) by which the press surface 632$b$ is apart from the joint surface 632$a$.

The conductor extension 633 illustrated in FIGS. 10 and 11 includes a cylindrical portion 633$a$ extending from the base end (that is, from the side of the flange 632) and a leading end portion 633$b$ disposed on a leading end side and having a diameter larger than the diameter of the cylindrical portion 633$a$. The cylindrical portion 633$a$ and the leading end portion 633$b$ form an outer peripheral surface of the conductor extension 633. The conductor extension 633 has a lock surface 633$c$ corresponding to the difference in level between the cylindrical portion 633$a$ and the leading end portion 633$b$ and locking the connection member 7 as the outer conductor 63 is fitted with the connection member 7 (see FIGS. 11 and 12).

Connection Member

The connection member 7 is elastic, and is also electrically conductive as it is produced by sheet metal working of an electrically conductive material such as copper or a copper alloy. The present embodiment is configured such that the connection member 7 is made of a base material containing a main component substantially identical in ionization tendency to the main component of the base material of the outer conductor 63. The second housing section 52 described above with reference to FIGS. 6 to 9 is made of a base material containing a main component stronger in ionization tendency than the main component of the base material of the connection member 7.

As illustrated in FIGS. 8 to 10, the connection member 7 includes an annular ring 71, a first coupler 72 at that end of the ring 71 which is on the X2 side (that is, on the side of the outer conductor 63), and a second coupler 73 at that end of the ring 71 which is on the X1 side (that is, on the side of the receptacle 1 [see FIG. 12]). The first coupler 72 faces the second coupler 73 across the ring 71.

As illustrated in FIG. 7, the ring 71 has a wall in the axial direction X, and is fitted around the conductor extension 633 of the outer conductor 63. Specifically, as illustrated in FIGS. 10 and 11, the ring 71 includes a plurality of (eight for the present embodiment) protrusions 711 protruding from the wall to the radially inward side R1.

The protrusions 711 are elastic, and are each a portion of the ring 71 which portion has been bent to the radially inward side R1. The protrusions 711 each have a leading end 711$a$ in contact with the lock surface 633$c$ of the conductor extension 633 (see FIG. 11). This restricts movement of the connection member 7 to the X1 side.

As illustrated in FIGS. 8 to 10, the first coupler 72 includes a plurality of (eight for the present embodiment) first coupler portions 721 disposed along the ring 71 at substantially equal intervals. The first coupler portions 721 each have a substantially rectangular shape in a plan view. The first coupler portions 721 each have a base end at a first end of the ring 71 and extend to the radially outward side R2. As illustrated in FIG. 11, the first coupler portions 721 are each so inclined as to form an obtuse angle with the ring 71. The first coupler portions 721 are each so elastic as to have a leading end portion displaceable in the axial direction X (that is, toward or away from the contact surface 632$c$). The first coupler portions 721 are, in other words, in contact with the contact surface 632$c$ of the outer conductor 63 in such a manner as to be displaceable in the axial direction X. This allows the connection member 7 to be electrically connected to the outer conductor 63.

As illustrated in FIG. 10, the second coupler 73 includes a plurality of (eight for the present embodiment) second coupler portions 731 disposed along the ring 71 at substantially equal intervals. The first and second coupler portions 721 and 731 may alternatively be disposed at unequal intervals. The first and second coupler portions 721 and 731 for the present embodiment coincide with each other along the perimeter of the ring 71. The first and second coupler portions 721 and 731 may alternatively be positioned differently. The first and second coupler portions 721 and 731 for the present embodiment are equal in number to each other. The first and second coupler portions 721 and 731 may alternatively be unequal in number to each other.

The second coupler portions 731 are each in the form of a plate having a base end at a second end of the ring 71 and extending in the axial direction X. Specifically, the second coupler portions 731 are each bent in a wavy shape as it extends in the axial direction X. The second coupler portions 731 each include a first bend 731a that bulges to the radially outward side R2 and a second bend 731b that bulges to the radially inward side R1. The first and second bends 731a and 731b are arranged in this order from the base end. The second coupler portions 731 are so elastic as to be displaceable in the radial direction R and in the axial direction X. As illustrated in FIG. 12, the second coupler portions 731 surround the receptacle 1 with the connector 6 connected to the receptacle 1. The second coupler portions 731 are such that each second bend 731b has a top (that is, the portion furthest on the radially inward side R1) in contact with the shell 2 of the receptacle 1. The second coupler portions 731 are displaceable in the radial direction R and in the axial direction X in that state. The second coupler portions 731 are, in other words, in contact with the shell 2 in such a manner as to be displaceable in the radial direction R and in the axial direction X. This allows the connection member 7 to be electrically connected to the shell 2.

Electrically connecting the connection member 7 to the shell 2 electrically connects the connection member 7 to the ground line on the substrate C3 through the shell 2 (see FIG. 12).

The ground line forms, for example, a filtering circuit configured to cause noise to escape from a signal line or power supply line on the substrate C3. The connection member 7, which is electrically connected to the ground line on the substrate C3 through the shell 2 of the receptacle 1 as described above, is also electrically connected to the outer conductor 63. The outer conductor 63 is electrically connectable to the outer conductor of the external connector LC. This allows the noise that the ground line has received to escape therefrom through the shell 2, the connection member 7, and the outer conductor 63 to the outer conductor of the external connector LC and finally to an external ground potential. This in turn allows noise to be removed from the IC on the substrate C3 (specifically, its signal line and power supply line) and prevents the IC from malfunctioning to prevent a decrease in the EMC.

The present embodiment is configured such that the facing side 632s of the outer conductor 63 has a step 632d. This allows a worker to easily identify the contact surface 632c (that is, distinguish between the contact surface 632c and the press surface 632b) when joining the second housing section 52 to the outer conductor 63. This in turn prevents a jig or the like from coming into contact with and damaging the contact surface 632c. The present embodiment thereby ensures contact between the outer conductor 63 and the connection member 7 to prevent a decrease in the EMC.

The present embodiment allows a worker to easily distinguish between the contact surface 632c, with which the connection member 7 is in contact, and the press surface 632b, with which a jig or the like comes into contact. This allows the worker to join the second housing section 52 to the outer conductor 63 more efficiently.

The present embodiment is configured such that the contact surface 632c is at the upper level relative to the step 632d, whereas the press surface 632b is at the lower level relative to the step 632d. This allows the connection member 7 (namely, each first coupler portion 721) to be in contact with the contact surface 632c and not with the press surface 632b, which may be damaged by contact with a jig or the like. This stabilizes the contact between the outer conductor 63 and the connection member 7 to prevent a decrease in the EMC.

The worker is also able to bring a jig or the like into contact with the step 632d, which is the boundary between the press surface 632b and the contact surface 632c, to fix the jig. This allows not only the jig but also the connection member 7 and the outer conductor 63 to be small, and in turn allows production of a small connector module 100.

The first coupler portions 721, which are disposed along the ring 71, allow the connection member 7 to be in contact with the outer conductor 63 at a plurality of contact points for improved contact stability. Further, the connection member 7 serves as an antenna for conducting electromagnetic waves to prevent emission thereof for better EMC.

The connection member 7 includes a plurality of second coupler portions 731 in contact with the receptacle 1 (specifically, the shell 2 thereof) in such a manner that the second coupler portions 731 are displaceable. The connector 6 may thus be misaligned in the radial direction R relative to the receptacle 1. However, the first coupler portions 721 are capable of accommodating displacement of the connection member 7 as they are in contact with the contact surface 632c of the outer conductor 63 in such a manner as to be deformable in the axial direction X (that is, toward or away from the flange 632). The first coupler portions 721 are, in other words, in contact with the contact surface 632c with a pressure unaffected by displacement of the connection member 7 in the radial direction R. This ensures contact between the outer conductor 63 and the connection member 7.

Locking the elastic protrusions 711 with the lock surface 633c, which corresponds to the difference in level between the cylindrical portion 633a and leading end portion 633b of the outer conductor 63, reduces contact point misalignment between the outer conductor 63 and the connection member 7 in the axial direction X. This allows the receptacle 1 to be small in the axial direction X, and thereby allows production of a small connector module 100.

The contact surface 632c of the outer conductor 63 is on the radially outward side R2 of the press surface 632b. This allows the connection member 7 to include first coupler portions 721 each long from its fixed end (that is, the ring 71) to its point of contact with the contact surface 632c (that is, each having a large spring length). This in turn allows the first coupler portions 721 to be elastically displaced by a large amount and to thereby be in contact with the contact surface 632c with a large pressure. The above configuration thereby allows for high contact reliability to prevent a decrease in the EMC. The present embodiment is configured such that the connection member 7 includes a main component substantially identical in ionization tendency to the main component of the outer conductor 63. This reduces the risk of a contact failure by electrolytic corrosion to prevent a decrease in the EMC.

The present embodiment is configured such that the second housing section 52 covers at least a portion of the substrate C3. This shields the substrate C3 from external electromagnetic waves and blocks noise emitted from the substrate C3.

The present embodiment is configured such that the outer conductor 63 and the connection member 7 are each made of copper or a copper alloy, each of which is highly elastic. This allows for stress relaxation and prevents the contact reliability from being decreased by repeated insertion and removal. Further, the contact surface 632c of the outer conductor 63 is on the radially outward side R2 of the press surface 632b. This allows the connection member 7 to include first coupler portions 721 each elastically displaceable by a large amount, and allows tolerances to be large in misalignment between the plug 10 (specifically, the connector 6) and the receptacle 1 in the direction of the mount surface of the substrate C3.

The present embodiment includes an outer conductor 63 having a joint surface 632a joined to the second housing section 52 such that the second housing section 52 is electrically connected to the flange 632 via the joint surface 632a. This allows noise to escape from the IC on the substrate C3 through the second housing section 52, the outer conductor 63, and the outer conductor of the external connector LC to an external ground potential for better EMC.

The present embodiment is configured such that the second housing section 52 and the outer conductor 63 are joined to each other for electric connection with an alloy layer therebetween. This ensures contact between the second housing section 52 and the outer conductor 63 to prevent a decrease in the EMC even if, for instance, the second housing section 52 and the outer conductor 63 are electrolytically corroded due to a difference in ionization tendency between their respective materials.

The second housing section 52 and the outer conductor 63 are ultrasonic-welded, resistance-welded, laser-welded, or soldered to each other for electric connection. The second housing section 52 and the outer conductor 63 may thus each be made of a material selectable without regard to electrolytic corrosion caused by contact between different materials. This means a greater degree of freedom in material selection with a focus on the cost and properties necessary for the purpose of use. This in turn allows for improved EMC.

ALTERNATIVE EMBODIMENTS (1) The embodiment described above is configured such that the contact surface 632c is on the radially outward side R2 of the press surface 632b. The contact surface 632c may alternatively be on the radially inward side R1 of the press surface 632b.

(2) The embodiment described above is configured such that the contact surface 632c is at an upper level portion, whereas the press surface 632b is at a lower level portion. The embodiment may alternatively be configured such that the press surface 632b is at an upper level portion, whereas the contact surface 632c is at a lower level portion. In other words, the connection member 7 may include first coupler portions 721 in contact with a contact surface 632c on the facing side 632s of the outer conductor 63 which contact surface 632c is at the lower level relative to the step 632d.

(3) The embodiment described above is configured such that the connection member 7 is electrically connected to the ground line on the substrate C3 through the shell 2. The connection member 7 may alternatively be electrically connected to the ground line directly or with another ground member therebetween in addition to the shell 2. The substrate C3 may support a sensor circuit thereon or be connected to another substrate supporting a sensor circuit thereon.

(4) The embodiment described above is configured such that the camera unit U is connected to a monitor with use of a coaxial cable L. The camera unit U is, however, not necessarily connected to a monitor, and may alternatively be connected to an image processing device, for example.

(5) The embodiment described above is configured such that the second housing section 52 covers a surface of at least a portion (that is, a surface on the X2 side) of the substrate C3. The second housing section 52 may alternatively cover an entire surface of the substrate C3. The second housing section 52 may further alternatively cover an entire surface of the substrate C3 together with another shield housing included in an element other than the camera unit U.

(6) The embodiment described above is an example in which the second housing section 52 functions as a shield for the substrate C3. The second housing section 52, however, does not necessarily function as a shield. The second housing section 52 may, in that case, be made of an electric insulator or an electric conductor. The second housing section 52, in this case, contains a separate shield member that combines with the second housing section 52 to define a container space 52s containing the substrate C3.

(7) The embodiment described above is configured such that the second housing section 52 is made of a base material containing aluminum as a main component. The second housing section 52 may alternatively be made of a base material containing magnesium as a main component. This prevents components such as the IC on the substrate C3 from being heated up excessively and malfunctioning in consequence. The second housing section 52 may further alternatively be made of a base material other than a base material containing aluminum or magnesium as a main component.

(8) The embodiment described above is an example in which the first and second housing sections 51 and 52 are two separate members. The first and second housing sections 51 and 52 may alternatively be integral with each other.

(9) The embodiment described above is configured such that the first and second contact point sections 611 and 612 are each in the form of a bar. The first and second contact point sections 611 and 612 are, however, not limited in shape. The first and second contact point sections 611 and 612 may alternatively each have a male structure in the form of a bar with a contact point on its outer surface or a female structure in the form of a cylinder with a contact point on its inner surface. The second contact point section 612 may further alternatively include a plurality of elastic portions extending in the axial direction X for a plurality of contact points.

(10) The embodiment described above is configured such that the shell 2, the contact housing 4, the holder 62, the conductor body 631, and the conductor extension 633 are each in the form of a cylinder. These elements are, however, not necessarily circular in a plan view. The flange 632 for the present embodiment is in the form of an annular ring. The flange 632 is, however, not necessarily in such a form, and may be in the form of any ring. The respective shapes of the press surface 632b and the contact surface 632c may vary according to the shape of the flange 632.

(11) The embodiment described above is an example including a coaxial cable L as a communication cable (electric wire). The communication cable may be any electrical communication cable for transmission of signals indicative of sounds, images, and/or the like. The communication cable may alternatively be a composite cable that combines a plurality of electric wires for different purposes and that includes an inner conductor and an outer conductor (that is, a shield) covering the inner conductor with an electric insulator therebetween. In the case where the communication cable is a composite cable, the receptacle 1 includes one or more first contacts 3, whereas the connector 6 includes one or more second contacts 61.

The invention claimed is:

1. A connector module, comprising:
   a receptacle on a substrate; and
   a plug electrically connected to the receptacle and electrically connectable to a communication cable,
   the plug including:
      a connector including an outer conductor electrically connectable to the communication cable; and
      a connection member connecting the connector to the receptacle and electrically connectable to a ground line on the substrate,
   the outer conductor including:
      a cylindrical conductor body; and
      an annular flange extending from the conductor body to a radially outward side,
   the flange including a step on a facing side facing the connection member,
   the step including an upper level portion and a lower level portion,
   the connection member including a ring fitted around the outer conductor and a first coupler extending from the ring on a side of the flange to a radially outward side,
   the first coupler including a plurality of elastic first coupler portions,
   the elastic first coupler portions being in contact with the upper level portion or the lower level portion in such a manner as to be elastically displaceable toward or away from the flange so as to be electrically connected with the outer conductor.

2. The connector module according to claim 1, wherein the receptacle includes at least one ground member electrically connected to the ground line, and
   the connection member is electrically connected to the ground line through the at least one ground member.

3. The connector module according to claim 2, wherein the connection member is in contact with the upper level portion.

4. The connector module according to claim 3, wherein the connection member further includes:
   a second coupler opposite to the first coupler across the ring and including a plurality of elastic second coupler portions in contact with the receptacle in such a manner as to be displaceable, and
   the first coupler portions are in contact with the upper level portion.

5. The connector module according to claim 2, wherein the connection member further includes:
   a second coupler opposite to the first coupler across the ring and including a plurality of elastic second coupler portions in contact with the receptacle in such a manner as to be displaceable, and
   the first coupler portions are in contact with the upper level portion.

6. The connector module according to claim 5, wherein the ring includes an elastic protrusion,
   the outer conductor further includes a cylindrical conductor extension having a base end at the flange, extending toward the connection member, and including:
      a cylindrical portion extending from the base end; and
      a leading end portion disposed on a side of a leading end of the cylindrical conductor extension and having a diameter larger than a diameter of the cylindrical portion, and
   the protrusion is locked by a step between the cylindrical portion and the leading end portion.

7. The connector module according to claim 1, wherein the connection member is in contact with the upper level portion.

8. The connector module according to claim 7, wherein the connection member further includes:
   a second coupler opposite to the first coupler across the ring and including a plurality of elastic second coupler portions in contact with the receptacle in such a manner as to be displaceable, and
   the first coupler portions are in contact with the upper level portion.

9. The connector module according to claim 8, wherein the ring includes an elastic protrusion,
   the outer conductor further includes a cylindrical conductor extension having a base end at the flange, extending toward the connection member, and including:
      a cylindrical portion extending from the base end; and
      a leading end portion disposed on a side of a leading end of the cylindrical conductor extension and having a diameter larger than a diameter of the cylindrical portion, and
   the protrusion is locked by a step between the cylindrical portion and the leading end portion.

10. The connector module according to claim 1, wherein the connection member further includes:
    a second coupler opposite to the first coupler across the ring and including a plurality of elastic second coupler portions in contact with the receptacle in such a manner as to be displaceable, and
    the first coupler portions are in contact with the upper level portion.

11. The connector module according to claim 10, wherein the ring includes an elastic protrusion,
    the outer conductor further includes a cylindrical conductor extension having a base end at the flange, extending toward the connection member, and including:
       a cylindrical portion extending from the base end; and
       a leading end portion disposed on a side of a leading end of the cylindrical conductor extension and having a diameter larger than a diameter of the cylindrical portion, and
    the protrusion is locked by a step between the cylindrical portion and the leading end portion.

12. The connector module according to claim 1, wherein the upper level portion is on the radially outward side of the lower level portion.

13. The connector module according to claim 1, wherein the outer conductor is made of a base material containing a main component identical in ionization tendency to a main component of a base material of the connection member.

14. The connector module according to claim 13, wherein
the plug further includes a shield housing covering at least
a portion of the substrate and made of a base material
containing a main component stronger in ionization
tendency than the main component of the connection
member.

15. The connector module according to claim 14, wherein
the outer conductor and the connection member are each
made of copper or a copper alloy.

16. The connector module according to claim 14, wherein
the flange has a joint surface opposite to the facing side
and joined to the shield housing, and
the shield housing is electrically connected to the flange
via the joint surface.

\* \* \* \* \*